(12) United States Patent
Yoshimura et al.

(10) Patent No.: US 6,482,549 B2
(45) Date of Patent: Nov. 19, 2002

(54) RECHARGEABLE LITHIUM BATTERY

(75) Inventors: Seiji Yoshimura, Hirakata (JP); Takashi Okamoto, Hirakata (JP); Shin Fujitani, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/797,051

(22) Filed: Feb. 27, 2001

(65) Prior Publication Data

US 2002/0009644 A1 Jan. 24, 2002

(30) Foreign Application Priority Data

Mar. 1, 2000 (JP) .......................... 2000-055671

(51) Int. Cl.[7] .............................. H01M 10/40
(52) U.S. Cl. ................. 429/333; 429/224; 429/231.95
(58) Field of Search ................ 429/333, 224, 429/231.95

(56) References Cited

U.S. PATENT DOCUMENTS 5,569,558 A    10/1996    Takeuchi et al.

FOREIGN PATENT DOCUMENTS

| JP | 59003871 | * | 1/1984 |
| JP | 63114064 |   | 5/1988 |
| JP | 01235158 |   | 9/1989 |
| JP | 7014610  | * | 1/1995 |
| JP | 08279366 |   | 10/1996 |
| JP | 09320634 |   | 12/1997 |
| JP | 10247517 | * | 9/1998 |
| JP | 11219711 |   | 8/1999 |

* cited by examiner

Primary Examiner—John S. Maples
(74) Attorney, Agent, or Firm—W. F. Fasse; W. G. Fasse

(57) ABSTRACT

A rechargeable lithium battery includes a negative electrode containing lithium as an active material, a positive electrode containing a lithium-manganese complex oxide as an active material and a nonaqueous liquid electrolyte containing a solvent, a solute and trialkyl phosphite.

7 Claims, 1 Drawing Sheet

RECHARGEABLE LITHIUM BATTERY

CROSS-REFERENCE TO RELATED APPLICATION

The present Application is related to our copending application Ser. No. 09/804,560, filed on Mar. 9, 2001.

BACKGROUND OF THE INVENTION

1. Field of the Invention

The present invention relates to a rechargeable lithium battery which includes a negative electrode containing lithium as active material, a positive electrode containing a lithium-manganese complex oxide as active material, and a nonaqueous liquid electrolyte.

2. Description of Related Art

Manganese dioxide, because of its high discharge potential (vs. $Li/Li^+$) and ability to electrochemically store and release lithium, has been studied for use as positive electrode material of a rechargeable lithium battery.

Manganese dioxide tends to undergo destruction of its crystal structure when subjected to repetitive expansion and shrinkage during charge-discharge cycles. In order for the manganese dioxide to be feasible as the positive electrode material of a rechargeable lithium battery, the stability (charge-discharge cycle characteristics) of its crystal structure during charge-discharge cycles must be improved. For example, a lithium-manganese complex oxide composed of manganese dioxide and $Li_2MnO_3$ (See, for example, Japanese Patent Laying-Open No. Sho 63-114064) and a lithium-containing manganese dioxide produced by incorporating lithium into crystal lattice of manganese dioxide (See, for example, Japanese Patent Laying-Open No. Hei 1-235158 (one type of lithium-manganese complex oxide)) are reported as being effective to improve such crystal structure stability of manganese dioxide during charge-discharge cycling.

These lithium-manganese complex oxides exhibit good charge-discharge characteristics and have reached a practically acceptable level as the positive electrode material of a rechargeable battery.

Rechargeable lithium batteries using these lithium-manganese complex oxides for their positive electrode materials are often utilized as a memory backup power source for electronic equipments. However, as technology continues to push up performance and reliability levels of those equipments, they come to show problematically insufficient charge-discharge cycle performance characteristics in such application.

SUMMARY OF THE INVENTION

The present invention relates to improvement of such a rechargeable lithium battery containing a lithium-manganese complex oxide as its positive electrode active material, and its object is to provide a rechargeable lithium battery which exhibits excellent charge-discharge performance characteristics based on the improved nonaqueous liquid electrolyte.

In order to attain the above-described object, a rechargeable lithium battery in accordance with the present invention includes a negative electrode containing lithium as active material, a positive electrode containing lithium-manganese complex oxide as active material, and a nonaqueous liquid electrolyte containing a solute and a solvent. Characteristically, the nonaqueous liquid electrolyte further contains trialkyl phosphite.

In the present invention, a reaction occurs between trialkyl phosphite and lithium-manganese complex oxide to produce a phosphorous compound film on the lithium-manganese complex oxide. This film serves to prevent the occurrence of a side reaction between the liquid electrolyte and the lithium-manganese complex oxide during charge-discharge cycles, resulting in providing excellent charge-discharge cycle characteristics. If the proportion by volume of trialkyl phosphite to the total volume of the solvent and trialkyl phosphite is below 0.2%, the film formation may become insufficient. On the other hand, if it exceeds 15%, the phosphorous compound film may be thickened excessively to hinder the charge-discharge process. Thus, the amount by volume of trialkyl phosphite is preferably 0.2–15% of the total volume of the solvent and trialkyl phosphite. Particularly good charge-discharge cycle characteristics are obtained when the amount by volume of trialkyl phosphite is kept within the above-specified range.

Particularly good charge-discharge cycle performance characteristics result when the lithium-manganese complex oxide for use in the present invention is a complex oxide of lithium and manganese into which boron or its compound is incorporated in the form of solid solution. This is because the positive electrode composed of such a composition is prevented from undergoing decomposition during charge so that no decomposition product dissolve out into the nonaqueous liquid electrolyte.

For example, Japanese Patent Laying-Open No. Hei 8-279366 (1996) discloses a useful lithium-manganese complex oxide containing boron in the form of solid solution. Specifically, a ratio of the number of boron to manganese atoms (B/Mn) is 0.01–0.20. A mean valence number of manganese is at least 3.80. This complex oxide can be prepared by a method wherein a mixture of a boron, lithium and manganese compound, in a ratio of numbers of atoms (B:Li:Mn) of 0.01–0.20:0.1–2.0:1, is heat treated at a temperature of 150–430° C., preferably of 250–430° C., more preferably of 300–430° C. If the temperature of heat treatment is below 150° C., several problems arise including insufficient progress of reaction and insufficient moisture removal from $MnO_2$. On the other hand, if the heat treatment temperature exceeds 430° C., decomposition of $MnO_2$ may be caused to occur to reduce a mean valence number of manganese to less than 3.80. As a result, the boron-containing lithium-manganese complex oxide during charge undergoes a change in electronic state to become unstable to result in the increased tendency thereof to decompose and dissolve into the nonaqueous liquid electrolyte. The heat treatment is preferably performed in the air.

Examples of boron compounds include boron oxide ($B_2O_3$), boric acid ($H_3BO_3$), metaboric acid ($HBO_2$), lithium metaborate ($LiBO_2$) and lithium tetraborate ($Li_2B_4O_7$). Examples of lithium compounds include lithium hydroxide (LiOH), lithium carbonate ($Li_2CO_3$), lithium oxide ($Li_2O$) and lithium nitrate ($LiNO_3$). Examples of manganese compounds include manganese dioxide and manganese oxyhydroxide (MnOOH).

Examples of nonaqueous liquid electrolyte solutes found effective to give good charge-discharge cycle performances include lithium trifluoromethane sulfonimide, lithium pentafluoroethane sulfonimide and lithium trifluoromethane sulfonmethide, which will be later illustrated in the Examples.

Examples of nonaqueous liquid electrolyte solvents found effective to provide good charge-discharge cycle performances are mixed solvents containing at least one organic solvent selected from the group consisting of ethylene carbonate, propylene carbonate, butylene carbonate, vinylene carbonate, γ-butyrolactone and sulfolane, and also containing at least one organic solvent selected from the group consisting of 1,2-dimethoxyethane, 1,2-diethoxyethane, 1,2-ethoxymethoxyethane, tetrahydrofuran, 1,3-dioxolane, dimethyl carbonate, diethyl carbonate and methyl ethyl carbonate. The liquid electolytes containing such mixed solvents exhibit high ionic conductivity. When such mixed solvents are used in combination with a negative electrode composed of an alloy of lithium and aluminum, a film having good ionic conductivity is formed on the negative electrode, resulting in the improved charge-discharge cycle performance characteristics.

The negative electrode contains metallic lithium or other active material capable of electrochemical storage and release of lithium. Examples of active materials capable of electrochemical storage and release of lithium include lithium alloys (such as a lithium-manganese alloy, lithium-aluminum-manganese alloy, lithium-lead alloy, lithium-tin alloy and lithium-silicon alloy), carbon materials such as graphite and coke and the like. Particularly when the negative electrode containing a lithium aluminum alloy is used in combination with the liquid electrolyte containing the mixed solvent according to the present invention, a film having good ionic conductivity is formed on the negative electrode, resulting in the improved charge-discharge cycle performance characteristics.

The present rechargeable battery utilizes a lithium-manganese complex oxide for the positive electrode material and trialkyl phosphite as one constituent of the nonaqueous liquid electrolyte. This combination prevents decomposition of the positive electrode material during charge to result in obtaining excellent charge-discharge cycle performance characteristics. Good charge-discharge cycle performance characteristics can be obtained when both of the positive electrode material and nonaqueous liquid electrolyte specified in the present invention are used in combination, but can not be obtained when either of them is used alone.

DESCRIPTION OF THE PREFERRED EXAMPLES

Figure 1:
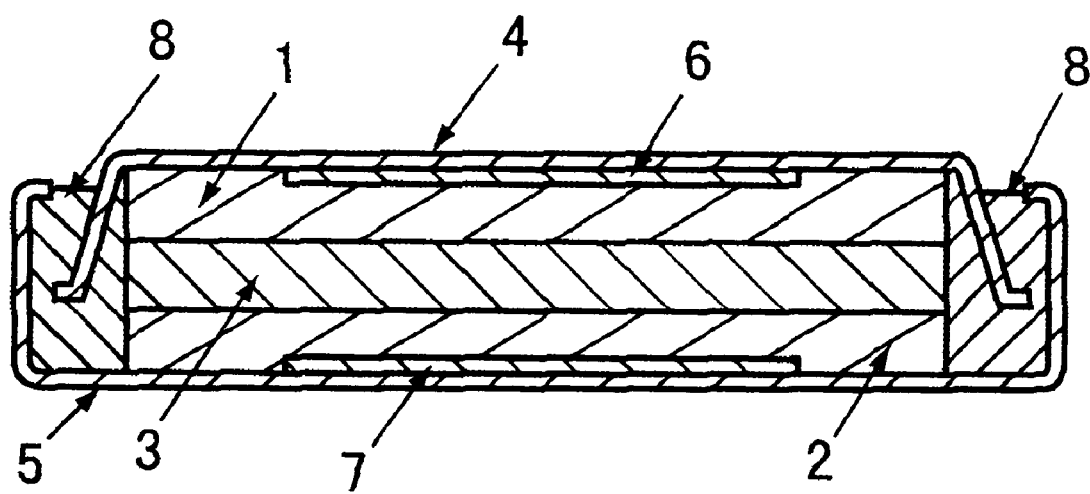
FIG. 1 is a schematic sectional view showing a flat-disc type rechargeable lithium battery in accordance with one embodiment of the present invention.

The present invention is now described in more detail with reference to preferred examples. It will be recognized that the following examples merely illustrate the practice of the present invention but are not intended to be limiting thereof. Suitable changes and modifications can be effected without departing from the scope of the present invention.

Example 1-1

(A) Positive Electrode Preparation Lithium hydroxide (LiOH), boron oxide ($B_2O_3$) and manganese dioxide ($MnO_2$) were mixed such that a ratio of numbers of Li, B and Mn atoms was brought to 0.53:0.06:1.00. The mixture was heat treated (calcined) at 375° C. for a period of 20 hours and then crushed to obtain a boron-containing lithium-manganese complex oxide for use as positive electrode active material. The obtained boron-containing lithium-manganese complex oxide was subjected to X-ray diffraction analysis. Only two peaks, i.e., a peak of $Li_2MnO_3$ and another peak of $MnO_2$ shifted slightly toward a lower angle side from a normal position, were observed in the X-ray diffraction pattern. Also, a mean valence number of manganese in the boron-containing lithium-manganese complex oxide was determined to be 3.80.

The following procedure was utilized to measure the mean valence number of manganese in the boron-containing lithium-manganese complex oxide. First, a sample was allowed to dissolve in hydrochloric acid to prepare a solution. Then, an aqueous solution of ammonium ferrous sulfate was added to the solution. An effective amount of oxygen present in the solution (oxidizing ability of manganese) was determined by a chemical titration method wherein excess ammonium ferrous sulfate was titrated with an aqueous solution of potassium permanganate. An amount of manganese present in the solution was also determined by atomic absorption spectrometry. A mean valence number of manganese in the boron-containing lithium-manganese complex oxide was calculated from the determined effective oxygen amount and manganese amount.

The mean valence number of manganese was found to be smaller than a normal manganese stoichiometry of 4. This is considered due to the entrance of slight amount of lithium into a solid solution of $MnO_2$, which is considered also responsible for the shifting of the $MnO_2$ peak toward a lower angle side in the X-ray diffraction pattern.

The boron-containing lithium-manganese complex oxide (in the powder form), carbon black (in the powder form) as an electronic conductor and a fluoro resin (in the powder form) as a binder were blended in the weight ratio of 85:10:5 to prepare a cathode mix. This cathode mix was formed in a mold into a circular disc and then dried under reduced pressure at 250° C. for a period of 2 hours to prepare a positive electrode.

(B) Negative Electrode Preparation

A lithium-aluminum (Li—Al) alloy was manufactured electrochemically and then punched to remove therefrom a disc-form negative electrode.

(C) Nonaqueous Liquid Electrolyte Preparation

Propylene carbonate (PC) and 1,2-dimethoxyethane (DME), as a mixed solvent, and trimethyl phosphite were blended in the ratio by volume of 47.5:47.5:5 to obtain a mixture. Then, lithium trifluoromethane sulfonimide (LiN($CF_3SO_2$)$_2$) as a solute was allowed to dissolve in the mixed solvent to a concentration of 1 mole/liter to prepare a nonaqueous liquid electrolyte.

(D) Battery Assembly

Using the above-prepared positive electrode, negative electrode and nonaqueous liquid electrolyte, a flat-disc type battery A-1 (rechargeable lithium battery sized 24 mm in outer diameter and 3 mm in thickness) according to the present invention was assembled. The separator used was a microporous polypropylene membrane into which the nonaqueous liquid electrolyte was impregnated.

FIG. 1 is a schematic sectional view of the assembled battery A-1 in accordance with the present invention. The shown battery A-1 of the present invention includes a negative electrode 1, a positive electrode 2, a separator 3 for separating these electrodes 1 and 2 from each other, a negative can 4, a positive can 5, a negative current collector 6 made of a stainless steel (SUS 304) sheet, a positive current collector 7 made of a stainless steel (SUS 316) sheet and an insulating gasket 8 made of polypropylene. The discharge capacity of 90–100 mAh was reported for all the batteries assembled in the following Examples and Comparative Examples.

The negative and positive electrodes 1 and 2 are located on opposite sides of the separator 3 impregnated with the nonaqueous liquid electrolyte and the assembly is housed in a battery casing defined by the negative and positive cans 4 and 5. The negative current collector 6 connects the negative electrode 1 to the negative can 4. The positive current collector 7 connects the positive electrode 2 to the positive can 5. A chemical energy produced in the battery can be taken out in the form of electrical energy from terminals connected to the negative and positive cans 4 and 5.

The internal resistance of the battery prior to charge-discharge cycle was measured to be about 10Ω. The internal resistance of about 10Ω was reported for all the batteries in the following Examples and Comparative Examples.

Example 1-2

The procedure of Example 1-1 was followed, except that trimethyl phosphite was replaced by triethyl phosphite in the preparation of the nonaqueous liquid electrolyte, to assemble a battery A-2 in accordance with the present invention.

Example 1-3

The procedure of Example 1-1 was followed, except that trimethyl phosphite was replaced by tri-n-propyl phosphite in the preparation of the nonaqueous liquid electrolyte, to assemble a battery A-3 in accordance with the present invention.

Example 1-4

The procedure of Example 1-1 was followed, except that trimethyl phosphite was replaced by tri-n-butyl phosphite in the preparation of the nonaqueous liquid electrolyte, to assemble a battery A-4 in accordance with the present invention.

Comparative Example 1-1

The procedure of Example 1-1 was followed, except that trimethyl phosphite was excluded in the preparation of the nonaqueous liquid electrolyte, to assemble a comparative battery X-1.

Charge-Discharge Cycle Test

Each of the batteries assembled in Examples A-1 through A-4 and Comparative Example 1-1 was subjected to repetitive charge-discharge cycling under the conditions of a charge-discharge rate of 10 mA, end-of-charge voltage of 3.2 V and end-of-discharge voltage of 2.0 V to measure the number of cycles during which the discharge capacity dropped to a half of its initial value. The number of cycles as measured is shown in Table 1. In the Table, 1 M of the solute means 1 mole/liter of the solute.

TABLE 1

| Designation of Battery | Solvent (Volume Ratio) | Trialkyl Phosphite (Volume Ratio) | Solute (1M) | Number of Cycles |
|---|---|---|---|---|
| A1 | PC/DME(47.5/47.5) | Trimethyl Phosphite(5) | $LiN(CF_3SO_2)_2$ | 55 |
| A2 | PC/DME(47.5/47.5) | Triethyl Phosphite(5) | $LiN(CF_3SO_2)_2$ | 52 |
| A3 | PC/DME(47.5/47.5) | Tri-n-Propyl Phosphite(5) | $LiN(CF_3SO_2)_2$ | 50 |

TABLE 1-continued

| Designation of Battery | Solvent (Volume Ratio) | Trialkyl Phosphite (Volume Ratio) | Solute (1M) | Number of Cycles |
|---|---|---|---|---|
| A4 | PC/DME(47.5/47.5) | Tri-n-Butyl Phosphite(5) | $LiN(CF_3SO_2)_2$ | 50 |
| X1 | PC/DME(50/50) | Absent | $LiN(CF_3SO_2)_2$ | 20 |

20 cycles were reported for the comparative battery X-1 which excluded trialkyl phosphite from the nonaqueous liquid electrolyte. In contrast, more cycles were reported for the batteries A-1–A-4 in accordance with the present invention which each incorporated trialkyl phosphite in the nonaqueous liquid electrolyte. The improved charge-discharge cycle performance characteristics are considered to result from the reaction between trialkyl phosphite and the lithium-manganese complex oxide, which produces on the lithium-manganese complex oxide a phosphorous compound film effective to prevent the occurrence of a side reaction between the liquid electrolyte and lithium-manganese complex oxide during charge-discharge cycles.

Example 2-1

The procedure of Example 1-1 was followed, with the exception that trimethyl phosphite was incorporated in the liquid electrolyte in the amount by volume of 0.2% of the total volume of the solvent and trimethyl phosphite, to assemble a battery B-1 in accordance with the present invention.

Example 2-2

The procedure of Example 1-1 was followed, with the exception that trimethyl phosphite was incorporated in the liquid electrolyte in the amount by volume of 1% of the total volume of the solvent and trimethyl phosphite, to assemble a battery B-2 in accordance with the present invention.

Example 2-3

The procedure of Example 1-1 was followed, with the exception that trimethyl phosphite was incorporated in the liquid electrolyte in the amount by volume of 2% of the total volume of the solvent and trimethyl phosphite, to assemble a battery B-3 in accordance with the present invention.

Example 2-4

Trimethyl phosphite was incorporated in the liquid electrolyte in the amount by volume of 5% of the total volume of the solvent and trimethyl phosphite, i.e., the procedure of Example 1-1 was exactly followed to assemble a battery B-4 (identical to the battery A-1) in accordance with the present invention.

Example 2-5

The procedure of Example 1-1 was followed, with the exception that trimethyl phosphite was incorporated in the liquid electrolyte in the amount by volume of 10% of the total volume of the solvent and trimethyl phosphite, to assemble a battery B-5 in accordance with the present invention.

Example 2-6

The procedure of Example 1-1 was followed, with the exception that trimethyl phosphite was incorporated in the liquid electrolyte in the amount by volume of 15% of the total volume of the solvent and trimethyl phosphite, to assemble a battery B-6 in accordance with the present invention.

Charge-Discharge Cycle Test

Each of the batteries B-1–B-6 in accordance with the present invention was subjected to a charge-discharge cycle test under the same conditions as in the preceding test. The results are given in the following Table 2.

TABLE 2

| Designation of Battery | Solvent (Volume Ratio) | Trialkyl Phosphite (Volume Ratio) | Solute (1M) | Number of Cycles |
|---|---|---|---|---|
| B1 | PC/DME(49.9/49.9) | Trimethyl Phosphite (0.2) | $LiN(CF_3SO_2)_2$ | 40 |
| B2 | PC/DME(49.5/49.5) | Trimethyl Phosphite(1) | $LiN(CF_3SO_2)_2$ | 45 |
| B3 | PC/DME(49/49) | Trimethyl Phosphite(2) | $LiN(CF_3SO_2)_2$ | 50 |
| B4(A1) | PC/DME(47.5/47.5) | Trimethyl Phosphite(5) | $LiN(CF_3SO_2)_2$ | 55 |
| B5 | PC/DME(45/45) | Trimethyl Phosphite (10) | $LiN(CF_3SO_2)_2$ | 52 |
| B6 | PC/DME(42.5/42.5) | Trimethyl Phosphite (15) | $LiN(CF_3SO_2)_2$ | 50 |

As can be appreciated from Table 2, the ratio by volume of trimethyl phosphite to the total volume of the aforesaid mixed solvent and trimethyl phosphite, if below 0.2%, tends to result in the insufficient film formation and, if above 15%, results in the increased difficulty for the charge-discharge reaction to take place due to the thicker formation of phosphorous compound film. It is therefore considered that particularly good charge-discharge cycle performance characteristics result when the amount by volume of trimethyl phosphate is 0.2–15% of the total volume of the mixed solvent and trimethyl phosphite.

Example 3-1

Lithium hydroxide (LiOH), boron oxide ($B_2O_3$) and manganese dioxide ($MnO_2$) were mixed such that a ratio of numbers of Li, B and Mn atoms was brought to 0.50:0:1.00, heat treated in the air at 375° C. for a period of 20 hours to obtain a boron-free lithium-manganese complex oxide for use as positive electrode active material. Otherwise, the procedure of Example 1-1 was followed to assemble a battery C-1 in accordance with the present invention.

Example 3-2

Lithium hydroxide (LiOH), boron oxide ($B_2O_3$) and manganese dioxide ($MnO_2$) were mixed such that a ratio of numbers of Li, B and Mn atoms was brought to 0.51:0.01:1.00, heat treated in the air at 375° C. for a period of 20 hours to obtain a boron-containing lithium-manganese complex oxide for use as positive electrode active material. Otherwise, the procedure of Example 1-1 was followed to assemble a battery C-2 in accordance with the present invention.

Example 3-3

Lithium hydroxide (LiOH), boron oxide ($B_2O_3$) and manganese dioxide ($MnO_2$) were mixed such that a ratio of numbers of Li, B and Mn atoms was brought to 0.53:0.06:1.00, heat treated in the air at 375° C. for a period of 20 hours to obtain a boron-free lithium-manganese complex oxide for use as positive electrode active material. That is, the procedure of Example 1-1 was exactly followed to assemble a battery C-3 (identical to the battery A-1) in accordance with the present invention.

Example 3-4

Lithium hydroxide (LIOH), boron oxide ($B_2O_3$) and manganese dioxide ($MnO_2$) were mixed such that a ratio of numbers of Li, B and Mn atoms was brought to 0.55:0.10:1.00, heat treated in the air at 375° C. for a period of 20 hours to obtain a boron-free lithium-manganese complex oxide for use as positive electrode active material. Otherwise, the procedure of Example 1-1 was followed to assemble a battery C-4 in accordance with the present invention.

Example 3-5

Lithium hydroxide (LiOH), boron oxide ($B_2O_3$) and manganese dioxide ($MnO_2$) were mixed such that a ratio of numbers of Li, B and Mn atoms was brought to 0.60:0.20:1.00, heat treated in the air at 375° C. for a period of 20 hours to obtain a boron-free lithium-manganese complex oxide for use as positive electrode active material. Otherwise, the procedure of Example 1-1 was followed to assemble a battery C-5 in accordance with the present invention.

Charge-Discharge Cycle Test

Each of the batteries C-1–C-5 in accordance with the present invention was subjected to a charge-discharge cycle test under the same conditions as in the preceding test. The results are given in the following Table 3.

TABLE 3

| Designation of Battery | Li:B:Mn (Atomic Ratio) | Number of Cycles |
|---|---|---|
| C1 | 0.5:0:1 | 50 |
| C2 | 0.51:0.01:1 | 52 |
| C3(A1) | 0.53:0.06:1 | 55 |
| C4 | 0.55:0.10:1 | 54 |
| C5 | 0.60:0.20:1 | 52 |

As can be appreciated from Table 3, particularly good charge-discharge cycle performance characteristics result when the lithium-manganese complex oxide contains, in the form of solid solution, boron or a boron compound in the ratio (B/Mn) in number of boron to manganese atoms of 0.01–0.20. This is probably because the positive electrode material is prevented from being subjected to decomposition during charge so that no decomposition product is allowed to dissolve out into the nonaqueous liquid electrolyte.

Example 4-1

Lithium trifluoromethane sulfonimide ($LiN(CF_3SO_2)_2$) was used as a nonaqueous liquid electrolyte solute, i.e., the procedure of Example 1-1 was exactly followed to assemble a battery D-1 (identical to the battery A-1) in accordance with the present invention.

Example 4-2

The procedure of Example 1-1 was followed, except that lithium pentafluoroethane sulfonimide ($LiN(C_2F_5SO_2)_2$) was used as the nonaqueous liquid electrolyte solute, to assemble a battery D-2 in accordance with the present invention.

Example 4-3

The procedure of Example 1-1 was followed, except that lithium trifluoromethane sulfonmethide ($LiC(CF_3SO_2)_3$) was used as the nonaqueous liquid electrolyte solute, to assemble a battery D-3 in accordance with the present invention.

Example 4-4

The procedure of Example 1-1 was followed, except that lithium trifluoromethanesulfonate ($LiC(CF_3SO_3)$) was used as the nonaqueous liquid electrolyte solute, to assemble a battery D-4 in accordance with the present invention.

Example 4-5

The procedure of Example 1-1 was followed, except that lithium hexafluorophosphate ($LiPF_6$) was used as the nonaqueous liquid electrolyte solute, to assemble a battery D-5 in accordance with the present invention.

Example 4-6

The procedure of Example 1-1 was followed, except that lithium tetrafluoroborate ($LiBF_4$) was used as the nonaqueous liquid electrolyte solute, to assemble a battery D-6 in accordance with the present invention.

Example 4-7

The procedure of Example 1-1 was followed, except that lithium hexafluoroarsenate ($LiAsF_6$) was used as the nonaqueous liquid electrolyte solute, to assemble a battery D-7 in accordance with the present invention.

Example 4-8

The procedure of Example 1-1 was followed, except that lithium perchlorate ($LiClO_4$) was used as the nonaqueous liquid electrolyte solute, to assemble a battery D-8 in accordance with the present invention.

Charge-Discharge Cycle Test

Each of the batteries D-1–D-8 in accordance with the present invention was subjected to a charge-discharge cycle test under the same conditions as in the preceding test. The results are given in the following Table 4.

TABLE 4

| Designation of Battery | Solvent (Volume Ratio) | Trialkyl Phosphite (Volume Ratio) | Solute (1M) | Number of Cycles |
|---|---|---|---|---|
| D1(A1) | PC/DME(47.5/47.5) | Trimethyl Phosphite(5) | $LiN(CF_3SO_2)_2$ | 55 |
| D2 | PC/DME(47.5/47.5) | Trimethyl Phosphite(5) | $LiN(C_2F_5SO_2)_2$ | 53 |
| D3 | PC/DME(47.5/47.5) | Trimethyl Phosphite(5) | $LiC(CF_3SO_2)_3$ | 52 |
| D4 | PC/DME(47.5/47.5) | Trimethyl Phosphite(5) | $LiCF_3SO_3$ | 36 |
| D5 | PC/DME(47.5/47.5) | Trimethyl Phosphite(5) | $LiPF_6$ | 39 |
| D6 | PC/DME(47.5/47.5) | Trimethyl Phosphite(5) | $LiBF_4$ | 35 |
| D7 | PC/DME(47.5/47.5) | Trimethyl Phosphite(5) | $LiAsF_6$ | 33 |
| D8 | PC/DME(47.5/47.5) | Trimethyl Phosphite(5) | $LiClO_4$ | 30 |

As can be seen from Table 4, less than 40 cycles were reported for the batteries D-4–D-8 using $LiCF_3SO_3$, $LiPF_6$, $LiBF_4$, $LiAsF_6$ and $LiClO_4$ for their respective liquid electrolyte solutes, while more cycles were reported for the batteries D-1–D-3 using $LiN(CF_3SO_2)_2$, $LiN(C_2F_5SO_2)_2$ and $LiC(CF_3SO_2)_3$ for their respective liquid electrolyte solutes. This effect of improving charge-discharge cycle performance characteristics is found to become acute particularly when $LiN(CF_3SO_2)_2$ is used for the liquid electrolyte solute.

Example 5-1

Ethylene carbonate (EC) and 1,2-dimethoxyethane (DME) were blended in the ratio by volume of 47.5:47.5 to prepare a mixed solvent for inclusion in the nonaqueous liquid electrolyte. Otherwise, the procedure of Example 1-1 was followed to assemble a battery E-1 in accordance with the present invention.

Example 5-2

Butylene carbonate (BC) and 1,2-dimethoxyethane (DME) were blended in the ratio by volume of 47.5:47.5 to prepare a mixed solvent for inclusion in the nonaqueous liquid electrolyte. Otherwise, the procedure of Example 1-1 was followed to assemble a battery E-2 in accordance with the present invention.

Example 5-3

Vinylene carbonate (VC) and 1,2-dimethoxyethane (DME) were blended in the ratio by volume of 47.5:47.5 to prepare a mixed solvent for inclusion in the nonaqueous liquid electrolyte. Otherwise, the procedure of Example 1-1 was followed to assemble a battery E-3 in accordance with the present invention.

Example 5-4

γ-butyrolactone (γ-BL) and 1,2-dimethoxyethane (DME) were blended in the ratio by volume of 47.5:47.5 to prepare a mixed solvent for inclusion in the nonaqueous liquid electrolyte. Otherwise, the procedure of Example 1-1 was followed to assemble a battery E-4 in accordance with the present invention.

Example 5-5

Sulfolane (SL) and 1,2-dimethoxyethane (DME) were blended in the ratio by volume of 47.5:47.5 to prepare a mixed solvent for inclusion in the nonaqueous liquid electrolyte. Otherwise, the procedure of Example 1-1 was followed to assemble a battery E-5 in accordance with the present invention.

Example 5-6

Propylene carbonate (PC) and 1,2-diethoxyethane (DEE) were blended in the ratio by volume of 47.5:47.5 to prepare a mixed solvent for inclusion in the nonaqueous liquid electrolyte. Otherwise, the procedure of Example 1-1 was followed to assemble a battery E-6 in accordance with the present invention.

Example 5-7

Propylene carbonate (PC) and 1,2-ethoxymethoxyethane (EME) were blended in the ratio by volume of 47.5:47.5 to prepare a mixed solvent for inclusion in the nonaqueous liquid electrolyte. Otherwise, the procedure of Example 1-1 was followed to assemble a battery E-7 in accordance with the present invention.

Example 5-8

Propylene carbonate (PC) and tetrahydrofuran (THF) were blended in the ratio by volume of 47.5:47.5 to prepare a mixed solvent for inclusion in the nonaqueous liquid electrolyte. Otherwise, the procedure of Example 1-1 was followed to assemble a battery E-8 in accordance with the present invention.

Example 5-9

Propylene carbonate (PC) and 1,3-dioxolane (DOXL) were blended in the ratio by volume of 47.5:47.5 to prepare a mixed solvent for inclusion in the nonaqueous liquid electrolyte. Otherwise, the procedure of Example 1-1 was followed to assemble a battery E-9 in accordance with the present invention.

Example 5-10

Propylene carbonate (PC) and dimethyl carbonate (DMC) were blended in the ratio by volume of 47.5:47.5 to prepare a mixed solvent for inclusion in the nonaqueous liquid electrolyte. Otherwise, the procedure of Example 1-1 was followed to assemble a battery E-10 in accordance with the present invention.

Example 5-11

Propylene carbonate (PC) and diethyl carbonate (DEC) were blended in the ratio by volume of 47.5:47.5 to prepare a mixed solvent for inclusion in the nonaqueous liquid electrolyte. Otherwise, the procedure of Example 1-1 was followed to assemble a battery E-11 in accordance with the present invention.

Example 5-12

Propylene carbonate (PC) and ethyl methyl carbonate (EMC) were blended in the ratio by volume of 47.5:47.5 to prepare a mixed solvent for inclusion in the nonaqueous liquid electrolyte. Otherwise, the procedure of Example 1-1 was followed to assemble a battery E-12 in accordance with the present invention.

Example 5-13

Propylene carbonate (PC) was used as a sole solvent for inclusion in the nonaqueous liquid electrolyte. Otherwise, the procedure of Example 1-1 was followed to assemble a battery E-13 in accordance with the present invention.

Example 5-14

Ethylene carbonate (EC) was used as a sole solvent for inclusion in the nonaqueous liquid electrolyte. Otherwise, the procedure of Example 1-1 was followed to assemble a battery E-14 in accordance with the present invention.

Example 5-15

Butylene carbonate (BC) was used as a sole solvent for inclusion in the nonaqueous liquid electrolyte. Otherwise, the procedure of Example 1-1 was followed to assemble a battery E-15 in accordance with the present invention.

Example 5-16

Vinylene carbonate (VC) was used as a sole solvent for inclusion in the nonaqueous liquid electrolyte. Otherwise, the procedure of Example 1-1 was followed to assemble a battery E-16 in accordance with the present invention.

Example 5-17

γ-butyrolactone (γ-BL) was used as a sole solvent for inclusion in the nonaqueous liquid electrolyte. Otherwise, the procedure of Example 1-1 was followed to assemble a battery E-17 in accordance with the present invention.

Example 5-18

Sulfolane (SL) was used as a sole solvent for inclusion in the nonaqueous liquid electrolyte. Otherwise, the procedure of Example 1-1 was followed to assemble a battery E-18 in accordance with the present invention.

Example 5-19

1,2-dimethoxyethane (DME) was used as a sole solvent for inclusion in the nonaqueous liquid electrolyte. Otherwise, the procedure of Example 1-1 was followed to assemble a battery E-19 in accordance with the present invention.

Example 5-20

1,2-diethoxyethane (DEE) was used as a sole solvent for inclusion in the nonaqueous liquid electrolyte. Otherwise, the procedure of Example 1-1 was followed to assemble a battery E-20 in accordance with the present invention.

Example 5-21

1,2-ethoxymethoxyethane (EME) was used as a sole solvent for inclusion in the nonaqueous liquid electrolyte. Otherwise, the procedure of Example 1-1 was followed to assemble a battery E-21 in accordance with the present invention.

Example 5-22

Tetrahydrofuran (THF) was used as a sole solvent for inclusion in the nonaqueous liquid electrolyte. Otherwise, the procedure of Example 1-1 was followed to assemble a battery E-22 in accordance with the present invention.

Example 5-23

1,3-dioxolane (DOXL) was used as a sole solvent for inclusion in the nonaqueous liquid electrolyte. Otherwise, the procedure of Example 1-1 was followed to assemble a battery E-23 in accordance with the present invention.

Example 5-24

Dimethyl carbonate (DMC) was used as a sole solvent for inclusion in the nonaqueous liquid electrolyte. Otherwise, the procedure of Example 1-1 was followed to assemble a battery E-24 in accordance with the present invention.

Example 5-25

Diethyl carbonate (DEC) was used as a sole solvent for inclusion in the nonaqueous liquid electrolyte. Otherwise, the procedure of Example 1-1 was followed to assemble a battery E-25 in accordance with the present invention.

Example 5-26

Ethyl methyl carbonate (EMC) was used as a sole solvent for inclusion in the nonaqueous liquid electrolyte. Otherwise, the procedure of Example 1-1 was followed to assemble a battery E-26 in accordance with the present invention.

Charge-Discharge Cycle Test

Each of the batteries E-1–E-26 in accordance with the present invention was subjected to a charge-discharge cycle test under the same conditions as in the preceding test. The results are given in the following Table 5.

TABLE 5

| Designation of Battery | Solvent (Volume Ratio) | Trialkyl Phosphite (Volume Ratio) | Solute (1M) | Number of Cycles |
|---|---|---|---|---|
| A1 | PC/DME(47.5/47.5) | Trimethyl Phosphite(5) | $LiN(CF_3SO_2)_2$ | 55 |
| E1 | EC/DME(47.5/47.5) | Trimethyl Phosphite(5) | $LiN(CF_3SO_2)_2$ | 54 |
| E2 | BC/DME(47.5/47.5) | Trimethyl Phosphite(5) | $LiN(CF_3SO_2)_2$ | 52 |
| E3 | VC/DME(47.5/47.5) | Trimethyl Phosphite(5) | $LiN(CF_3SO_2)_2$ | 49 |
| E4 | γ-BL/DME(47.5/47.5) | Trimethyl Phosphite(5) | $LiN(CF_3SO_2)_2$ | 46 |
| E5 | SL/DME(47.5/47.5) | Trimethyl Phosphite(5) | $LiN(CF_3SO_2)_2$ | 45 |
| E6 | PC/DEE(47.5/47.5) | Trimethyl Phosphite(5) | $LiN(CF_3SO_2)_2$ | 47 |
| E7 | PC/EME(47.5/47.5) | Trimethyl Phosphite(5) | $LiN(CF_3SO_2)_2$ | 49 |
| E8 | PC/THF(47.5/47.5) | Trimethyl Phosphite(5) | $LiN(CF_3SO_2)_2$ | 44 |
| E9 | PC/DOXL(47.5/47.5) | Trimethyl Phosphite(5) | $LiN(CF_3SO_2)_2$ | 43 |
| E10 | PC/DMC(47.5/47.5) | Trimethyl Phosphite(5) | $LiN(CF_3SO_2)_2$ | 47 |
| E11 | PC/DEC(47.5/47.5) | Trimethyl Phosphite(5) | $LiN(CF_3SO_2)_2$ | 49 |
| E12 | PC/EMC(47.5/47.5) | Trimethyl Phosphite(5) | $LiN(CF_3SO_2)_2$ | 47 |
| E13 | PC(95) | Trimethyl Phosphite(5) | $LiN(CF_3SO_2)_2$ | 35 |
| E14 | EC(95) | Trimethyl Phosphite(5) | $LiN(CF_3SO_2)_2$ | 35 |
| E15 | BC(95) | Trimethyl Phosphite(5) | $LiN(CF_3SO_2)_2$ | 37 |
| E16 | VC(95) | Trimethyl Phosphite(5) | $LiN(CF_3SO_2)_2$ | 33 |
| E17 | γ-BL(95) | Trimethyl Phosphite(5) | $LiN(CF_3SO_2)_2$ | 34 |
| E18 | SL(95) | Trimethyl Phosphite(5) | $LiN(CF_3SO_2)_2$ | 33 |
| E19 | DME(95) | Trimethyl Phosphite(5) | $LiN(CF_3SO_2)_2$ | 30 |
| E20 | DEE(95) | Trimethyl Phosphite(5) | $LiN(CF_3SO_2)_2$ | 31 |
| E21 | EME(95) | Trimethyl Phosphite(5) | $LiN(CF_3SO_2)_2$ | 33 |
| E22 | THF(95) | Trimethyl Phosphite(5) | $LiN(CF_3SO_2)_2$ | 32 |
| E23 | DOXL(95) | Trimethyl Phosphite(5) | $LiN(CF_3SO_2)_2$ | 31 |
| E24 | DMC(95) | Trimethyl Phosphite(5) | $LiN(CF_3SO_2)_2$ | 33 |
| E25 | DEC(95) | Trimethyl Phosphite(5) | $LiN(CF_3SO_2)_2$ | 34 |
| E26 | EMC(95) | Trimethyl Phosphite 5 | $LiN(CF_3SO_2)_2$ | 32 |

As can be seen from Table 5, less than 40 cycles were reported for the batteries E-13–E-26 using sole solvents for incorporation in their respective nonaqueous liquid electrolytes. In contrast, particularly good charge-discharge cycle performance characteristics were reported for the batteries A-1 and E-1–E-12 using any of mixed solvents containing at least one organic solvent selected from the group consisting of ethylene carbonate, propylene carbonate, butylene carbonate, vinylene carbonate, γ-butyrolactone and sulfolane, and also at least one organic solvent selected from the group consisting of 1,2-dimethoxyethane, 1,2-diethoxyethane, 1,2-ethoxymethoxyethane, tetrahydrofuran, 1,3-dioxolane, dimethyl carbonate, diethyl carbonate and methyl ethyl carbonate for inclusion in their respective nonaqueous liquid electrolytes.

In accordance with the present invention, rechargeable lithium batteries can be provided which exhibit good charge-discharge cycle performance characteristics and extremely high reliability.

What is claimed is:

1. A rechargeable lithium battery including:
   a negative electrode containing lithium as active material;
   a positive electrode containing a lithium-manganese complex oxide as active material, wherein said lithium-manganese complex oxide is produced by incorporating, in the form of solid solution, boron or a boron compound in a complex oxide of lithium and manganese; and a nonaqueous liquid electrolyte containing a solvent, a solute and trialkyl phosphite.

2. The rechargeable lithium battery of claim 1, wherein the amount by volume of said trialkyl phosphite is 0.2–15% of the total volume of the solvent and trialkyl phosphite.

3. The rechargeable lithium battery of claim 1, wherein a ratio in number of boron atoms to manganese atoms present in said lithium-manganese complex oxide is in the range of 0.01–0.20.

4. The rechargeable lithium battery of claim 1, wherein said solute is lithium trifluoromethane sulfonimide, lithium pentafluoroethane sulfonimide or lithium trifluoromethane sulfonmethide.

5. The rechargeable lithium battery of claim 1, wherein said solvent is a mixed solvent containing at least one organic solvent selected from the group consisting of ethylene carbonate, propylene carbonate, butylene carbonate, vinylene carbonate, γ-butyrolactone and sulfolane, and also containing at least one organic solvent selected from the group consisting of 1,2-dimethoxyethane, 1,2-diethoxyethane, 1,2-ethoxymethoxyethane, tetrahydrofuran, 1,3-dioxolane, dimethyl carbonate, diethyl carbonate and methyl ethyl carbonate.

6. The rechargeable lithium battery of claim 5, wherein said mixed solvent contains propylene carbonate and 1,2-dimethoxyethane.

7. The rechargeable lithium battery of claim 1, wherein said negative electrode is fabricated from an alloy of lithium and aluminum.

* * * * *

UNITED STATES PATENT AND TRADEMARK OFFICE
CERTIFICATE OF CORRECTION

PATENT NO.    : 6,482,549 B2
DATED         : November 19, 2002
INVENTOR(S)   : Yoshimura et al.

It is certified that error appears in the above-identified patent and that said Letters Patent is hereby corrected as shown below:

Column 2,
Line 52, before "lithium", replace "($HBQ_2$)," by -- ($HBO_2$), --.

Signed and Sealed this

Twenty-fifth Day of February, 2003

JAMES E. ROGAN
*Director of the United States Patent and Trademark Office*